United States Patent
Elenes

(10) Patent No.: US 9,253,007 B1
(45) Date of Patent: Feb. 2, 2016

(54) METHODS AND SYSTEMS FOR RAPID DETECTION OF DIGITAL CONTENT WITHIN RF SIGNALS

(71) Applicant: Silicon Laboratories Inc., Austin, TX (US)

(72) Inventor: Javier Elenes, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/512,739

(22) Filed: Oct. 13, 2014

(51) Int. Cl.
*H04L 27/06* (2006.01)
*H04L 27/26* (2006.01)

(52) U.S. Cl.
CPC ........ *H04L 27/2663* (2013.01); *H04L 27/2649* (2013.01)

(58) Field of Classification Search
CPC  H04L 27/2663; H04L 27/2649; H04B 17/26; H04B 17/00
See application file for complete search history.

(56) References Cited

U.S. PATENT DOCUMENTS

| | | | |
|---|---|---|---|
| 7,339,503 B1 | 3/2008 | Elenes | |
| 7,483,501 B1 | 1/2009 | Michaels, Jr. | |
| 7,555,065 B1 | 6/2009 | Lou et al. | |
| 8,224,254 B2 | 7/2012 | Haykin | |
| 2002/0172270 A1 | 11/2002 | Whikehart et al. | |
| 2006/0088133 A1* | 4/2006 | Chen | H04L 25/0222 375/343 |
| 2006/0120468 A1* | 6/2006 | Lin | H04L 27/2607 375/260 |
| 2008/0298515 A1 | 12/2008 | Peyla et al. | |
| 2009/0103667 A1* | 4/2009 | Du | H04L 27/2647 375/343 |
| 2011/0039492 A1 | 2/2011 | Johnson et al. | |
| 2012/0028567 A1 | 2/2012 | Marko | |
| 2012/0082271 A1* | 4/2012 | Elenes | H04H 20/30 375/343 |
| 2012/0108191 A1 | 5/2012 | Henson | |
| 2013/0129022 A1* | 5/2013 | Wei | 375/343 |

OTHER PUBLICATIONS

Brookes, "Digital Audio Broadcasting", Jan. 2006, 44 pgs.
Elenes et al., "Methods and Systems for Rapid Detection of Digital Radio Signals", U.S. Appl. No. 13/906,465, filed May 31, 2013, Application, 42 pgs.

* cited by examiner

*Primary Examiner* — Syed Haider
(74) *Attorney, Agent, or Firm* — Egan, Peterman, Enders LLP.

(57) ABSTRACT

Systems and methods are disclosed for rapid detection of digital content within received radio frequency (RF) signals. The disclosed embodiments digitize received RF signals and apply a cyclic prefix correlation to generate correlation values that are accumulated over a plurality of symbol times. The accumulated correlation values are then stored in a dump register after these plurality of symbol times, and the accumulated correlation values are used to determine whether or not digital content is present within the broadcast channel being analyzed. The disclosed embodiments are useful, for example, in determining whether DAB (Digital Radio Broadcast) digital content is present within audio broadcast channels by detecting the cyclic prefix within the DAB transmissions.

20 Claims, 5 Drawing Sheets

METHODS AND SYSTEMS FOR RAPID DETECTION OF DIGITAL CONTENT WITHIN RF SIGNALS

TECHNICAL FIELD OF THE INVENTION

This invention relates to the detection of digital content within radio frequency (RF) signals for broadcast channels and, more particularly, to detection of DAB (Digital Audio Broadcasting) signals.

BACKGROUND

Within the United States, digital radio broadcasts protocols are based upon the HD (High Definition) Radio standard developed by iBiquity Digital Corporation. For current HD Radio broadcasts, digital content is broadcast in upper and lower sidebands related to a center frequency for a primary analog AM or FM broadcast channel. These upper and lower sidebands include ten (10) frequency partitions which include digital channels that are modulated using OFDM (orthogonal frequency division multiplexing) and are further shaped using a pulse shaping function prior to transmission.

In other parts of the world including countries within Europe, one or more DAB (Digital Audio Broadcasting) standards are used for broadcasting of digital audio content. The DAB standards also use OFDM modulation, and DAB broadcast channels include digital data within a large number of OFDM subcarriers that are modulated using DQSPK (differential quadrature phase shift keying) modulation. For example, Transmission Mode I (TM-I) for the DAB standard includes 1536 OFDM subcarriers each having a bandwidth of 1 kHz (kilo-hertz) within an overall OFDM channel having a bandwidth of 1.537 MHz (mega-Hertz). Each OFDM symbol for the TM-I DAB transmission has an overall symbol time of 1.246 milliseconds (ms) including a guard interval of 0.246 ms within which a cyclic prefix is transmitted and including a data region of 1 ms within which useful data is transmitted.

FIG. 1A (Prior Art) provides an embodiment 100 for a DAB channel 102 centered on a channel center frequency (fcH) 104. The DAB channel 102 includes 1536 OFDM subcarriers that are each modulated to include a portion of the broadcast data. For one embodiment as indicated above, each of these subcarriers can be 1 kHz wide and the overall bandwidth of the OFDM channel can be 1.537 MHz.

FIG. 1B (Prior Art) is an embodiment 150 for an OFDM symbol 152 associated with the DAB channel 102 in FIG. 1A (Prior Art). The OFDM symbol 152 has a guard interval 154 including a cyclic prefix and a region 156 including useful data for the OFDM symbol 152. The useful data region 156 includes M samples, and the cyclic prefix within the guard interval 154 includes a copy of the last L samples of the useful data region 156. As such, the guard interval 154 can be considered to include samples M−L to M−1, and the useful data region 156 can be considered to include samples 0 to M−1. The symbol time 158 for the OFDM symbol 152 represents the duration in time for the transmission of the OFDM symbol.

For DAB broadcast channels, a transmission frame is commonly used that includes one (1) null symbol having a symbol time of 1.297 ms followed by seventy-six (76) OFDM symbols each having a symbol time of 1.246 ms. As such, this example DAB transmission frame has an overall duration of 96 ms. Further, for this example DAB transmission frame, no power is transmitted during the null symbol, and the first OFDM symbol after null symbol is configured as a TFPR (Time Frequency Phase Reference) symbol. This TFPR symbol can be, for example, a pre-determined fixed pattern that is known by the receiver and used by the DAB receiver for synchronization.

Prior DAB receivers are typically configured to detect the null symbol within the DAB transmission frame and then to synchronize to the DAB transmission by correlating the received TFPR symbol with the ideal, expected TFPR symbol. However, this prior detection/synchronization technique can be relatively slow and thereby lead to a degraded and/or unsatisfactory user experience.

SUMMARY OF THE INVENTION

Systems and methods are disclosed for rapid detection of digital content within received radio frequency (RF) signals. The disclosed embodiments digitize received RF signals and apply a cyclic prefix correlation to generate correlation values that are accumulated over a plurality of symbol times. The accumulated correlation values are then stored in a dump register after these plurality of symbol times, and the accumulated correlation values are used to determine whether or not digital content is present within the broadcast channel being analyzed. The disclosed embodiments are useful, for example, in determining whether DAB (Digital Radio Broadcast) digital content is present within audio broadcast channels by detecting the cyclic prefix within the DAB transmissions. Other features and variations can be implemented, as desired, and related systems and methods can be utilized, as well.

For one embodiment, a method for detecting digital content in a radio frequency (RF) channel is disclosed that includes receiving radio frequency (RF) signals, digitizing signals associated with a channel within the RF signals to generate digital samples having a real component (I) and an imaginary component (Q), generating cyclic prefix correlation values based upon the digital samples over a plurality of symbol times associated with digital content being detected within the channel, accumulating the cyclic prefix correlation values in a plurality of accumulation registers over the plurality of symbol times to form a plurality of accumulated correlation values, storing the accumulated correlation values in a dump register after the plurality of symbol times, utilizing the accumulated correlation values within the dump register to determine whether digital content is present within the channel, and outputting a detection signal indicating whether or not digital content is present.

In other embodiments, the digital content is included within OFDM (orthogonal frequency division multiplexed) subcarriers within the channel. In addition, the digital content can also be modulated within the subcarriers based upon a DAB (Digital Audio Broadcast) standard. In additional embodiments, the plurality of symbol times can be equal to or less than four symbol times. Still further, a detection time to determine if digital content is present within the channel can be 5 milliseconds or less.

In further embodiments, the utilizing step includes searching for a peak accumulated correlation value within the dump register and comparing the peak accumulated value to a threshold value to determine whether digital content is present within the channel. In other embodiments, the utilizing step includes searching for a peak accumulated correlation value within the dump register, determining an average correlation value for the correlation values within the dump register, and comparing a ratio associated with the peak accumulated correlation value and the average correlation value to a threshold ratio value to determine whether digital content is present within the channel.

In still further embodiments, the generating step includes applying a recursive analysis to the digital samples to generate the cyclic prefix correlation values. In other embodiments, the method further includes decimating the digital I/Q samples prior to generating step. In additional embodiments, the method includes using the detection signal as part of a channel scan operation, and repeating the receiving, digitizing, generating, accumulating, dumping, utilizing and outputting steps for a plurality of different channels.

For another embodiment, a receiver system for detecting digital content in a radio frequency (RF) channel is disclosed that includes front-end circuitry configured to receive radio frequency (RF) signals and to output signals associated with a channel within the RF signals. analog-to-digital conversion (ADC) circuitry configured to receive the output signals and to output digital samples having a real component (I) and an imaginary component (Q), a plurality of accumulation registers, a dump register, a correlator configured to generate cyclic prefix correlation values based upon the digital samples over a plurality of symbol times associated with digital content being detected within the channel, an accumulator configured to accumulate the cyclic prefix correlation values in the plurality of accumulation registers over the plurality of symbol times to form a plurality of accumulated correlation values and to store the accumulated correlation values to the dump register after the plurality of symbol times, and a detector configured to utilize the accumulated correlation values to determine whether digital content is present within the channel and to output a detection signal indicating whether or not digital content is present.

In other embodiments, the digital content is included within OFDM (orthogonal frequency division multiplexed) subcarriers within the channel. In addition, the digital content can also be modulated within the subcarriers based upon a DAB (Digital Audio Broadcast) standard. In additional embodiments, the plurality of symbol times can be equal to or less than four symbol times. Still further, a detection time to determine if digital content is present can be within the channel is 5 milliseconds or less.

In further embodiments, the digital content detector includes a peak search engine configured to identify a peak accumulated correlation value within the dump register and a threshold comparator configured to compare the peak accumulated value to a threshold value to determine whether digital content is present within the channel. In other embodiments, the digital content detector includes a peak search engine configured to identify a peak accumulated correlation value within the dump register and to determine an average correlation value for the correlation values within the dump register and a threshold comparator configured to compare a ratio associated with the peak accumulated correlation value and the average correlation value to a threshold ratio value to determine whether digital content is present within the channel.

In still further embodiments, the correlator is configured to apply a recursive analysis to the digital samples to generate the cyclic prefix correlation values. In other embodiments, the receiver system further includes a decimator configured to receive the digital I/Q samples and to provide decimated digital I/Q samples to the correlator. In additional embodiments, the receiver system further includes a controller configured to perform a channel scan operation detection signals generated for a plurality of different channels.

Different and/or additional features, variations, and embodiments can be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Systems and methods are disclosed for rapid detection of digital content within received radio frequency (RF) signals. The disclosed embodiments digitize received RF signals and apply a cyclic prefix correlation to generate correlation values that are accumulated over a plurality of symbol times. The accumulated correlation values are then stored in a dump register after these plurality of symbol times, and the accumulated correlation values are used to determine whether or not digital content is present within the broadcast channel being analyzed. The disclosed embodiments are useful, for example, in determining whether DAB (Digital Audio Broadcasting) digital content is present within audio broadcast channels by detecting the cyclic prefix within the DAB transmissions. Other features and variations can be implemented, as desired, and related systems and methods can be utilized, as well.

Figure 1A:
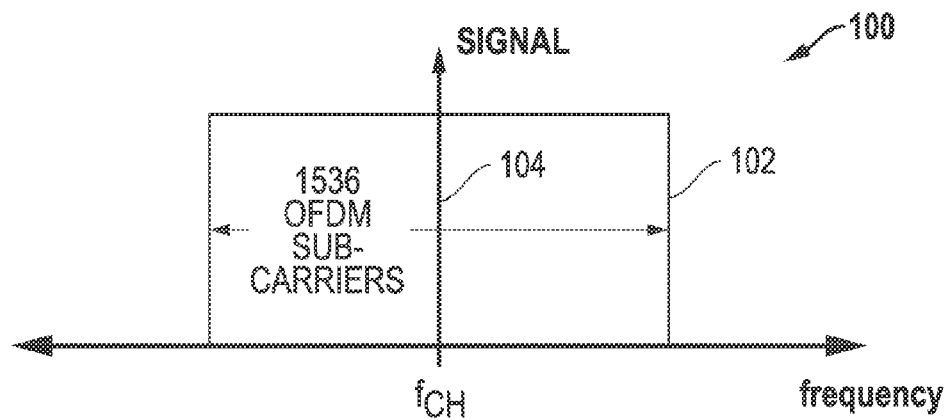
FIG. 1A (Prior Art) provides an embodiment for a DAB (digital audio broadcasting) channel centered on a channel center frequency ($f_{CH}$).
Figure 1B:
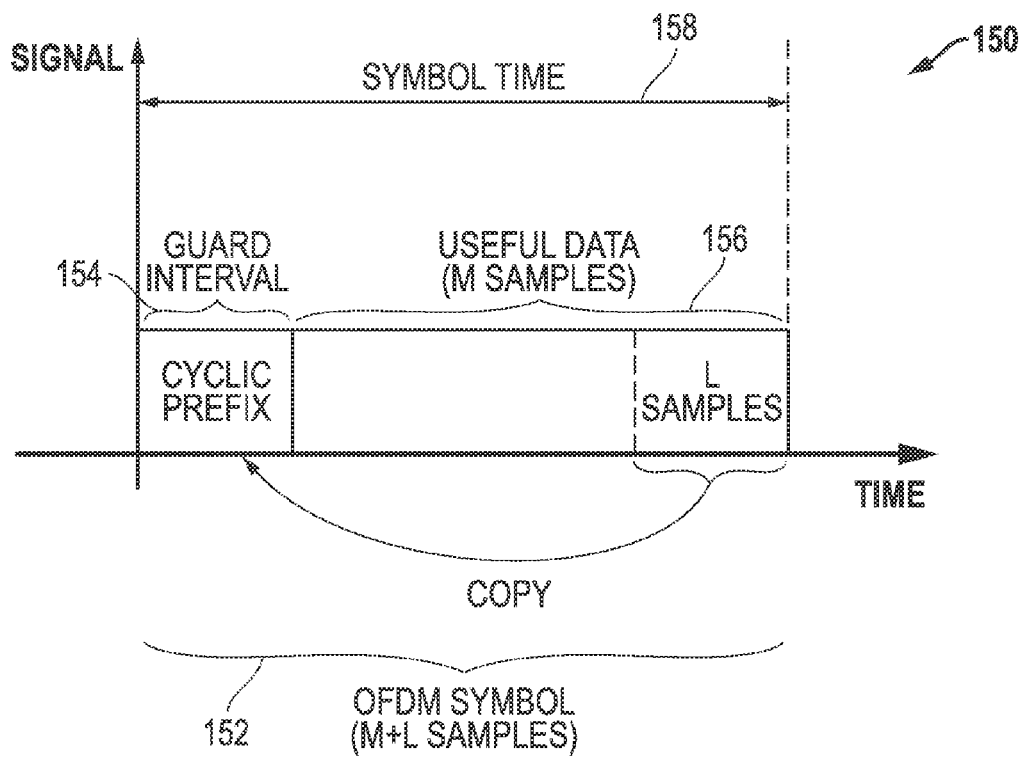
FIG. 1B (Prior Art) is an embodiment for an OFDM (orthogonal frequency division multiplexing) symbol associated with the DAB channel in FIG. 1A (Prior Art).

As described herein, the disclosed embodiments efficiently and rapidly detect the presence of digital content within broadcast channels by detecting a cyclic prefix associated with the digital content. This rapid detection of digital content is useful for receiver systems such as DAB receiver systems. For example, in order to implement channel seek and channel scan capabilities, DAB receiver systems have the need to rapidly evaluate whether digital content is being broadcast within broadcast channels being analyzed. As described above with respect to FIG. 1A (Prior Art), DAB is a digital radio broadcasting standard that transmits digital content on a large number of OFDM subcarriers within a frequency range around a channel center frequency ($f_{CH}$). To achieve rapid detection of digital content within the received signals, the embodiments described herein detect the cyclic prefix transmitted within a guard interval associated with the digital content within the broadcast channel. Using correlation values associated with a cyclic prefix, the embodiments described herein can quickly determine whether a broadcast channel has digital content or whether the broadcast channel does not have detectable digital content. This rapid detection of digital content, such as DAB transmissions, improves the overall user experience.

As indicated above, prior techniques for detection of the presence of DAB digital content can be slow, can be computationally intensive, and can require significant hardware resources. As indicated above, prior DAB receivers detect the null symbol and then correlate the received TFPR (Time Frequency Phase Reference) symbol with the ideal, expected TFPR symbol in order the synchronize to the DAB frame transmission. Advantageously, the embodiments described herein provide fast detection of DAB transmissions and do not require synchronization to the DAB frame thereby significantly reducing detection time and hardware resources. For example, the disclosed embodiments can achieve detection times of five (5) milliseconds or less while still using a relatively small amount of hardware resources.

Figure 2:
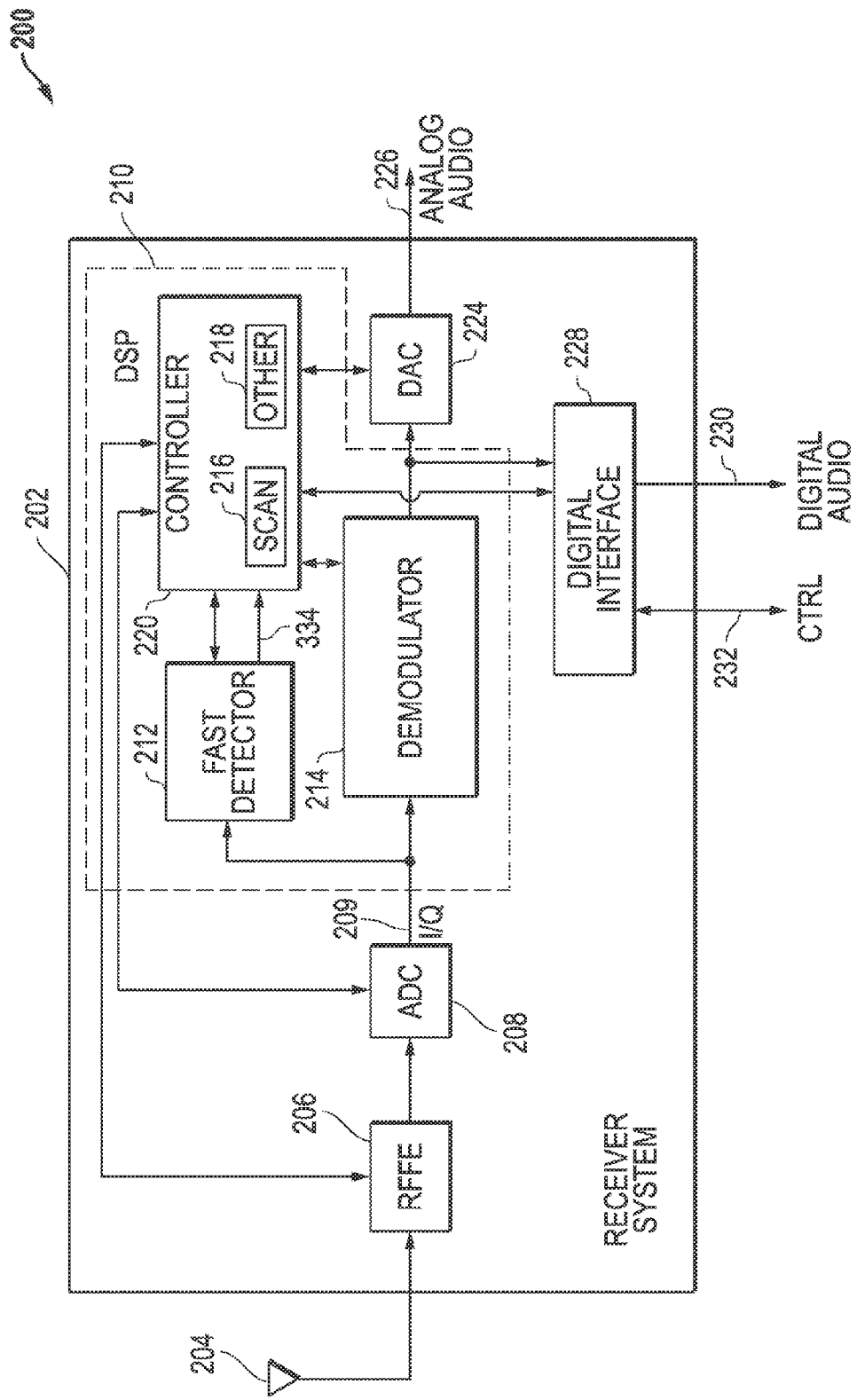
FIG. 2 is a block diagram of an example embodiment for a receiver system that includes a fast detector and a demodulator for digital content within radio frequency (RF) transmissions such as DAB transmissions.

FIG. 2 is a block diagram of an example embodiment 200 for a receiver system 202 that includes a fast detector 212 and a demodulator 214 for detecting digital content such as DAB transmissions within an RF signal spectrum. For the embodiment 200 depicted, incoming RF (radio frequency) signals are received by antenna 204 and provided to RFFE (RF front end) circuitry 206. The RFFE circuitry 206 receives the RF input signals and outputs signals associated with the channel to be tuned. For example, the RFFE circuitry 206 can use a mixer to down-convert a selected broadcast channel within the received RF signal spectrum to a lower frequency. This down-converted frequency can be, for example, an intermediate frequency (IF) at some desired lower target frequency or a direct down-conversion frequency of zero IF (i.e., 0 Hz). Other RF front end architectures can also be utilized for the receiver system 202 such as dual down-conversion, direct spectrum digitization without down conversion, and/or other desired architectures and variations.

The down-converted RF signals output by the RFFE circuitry 206 can include real (I) and imaginary (Q) components. It is noted that radio frequency (RF) signals can have frequencies from about 3 kilohertz (kHz) to 10 gigahertz (GHz) and above, regardless of the medium through which such signal is conveyed. An RF signal may be transmitted, for example, through air, free space, electrical wires, coaxial cable, fiber optic cable, and/or other mediums. It is further noted that DAB channels are typically broadcast between about 174-240 MHz (mega-Hertz) and 1452-1492 MHz, although other frequency bands can also be used. Other variations can also be implemented.

The output signals from the RFFE circuitry 206 are digitized by analog-to-digital conversion (ADC) circuitry 208 to provide digital output samples 209. These digital output signals 209 can also include real (I) and imaginary (Q) components. The digital I/Q samples 209 from the ADC circuitry 208 are provided to the DAB fast detector 212 and to the DAB demodulator 214 within the digital signal processor (DSP) 210. The DSP 210 also includes controller 220 that communicates with the DAB fast detector 212 and the DAB demodulator 214 as well as with RFFE circuitry 206, the ADC circuitry 208, the digital interface 228, and the digital-to-analog converter (DAC) circuitry 224. The controller 220 can include scan control block 216, which is used to control channel scan operations for the DAB receiver system 202, and/or other control blocks 218, which are used to control other operations for the DAB receiver system 202. The DAB demodulator 214 demodulates the OFDM symbols within the digital I/Q samples 209 and outputs digital audio signals to the DAC circuitry 224 and to the digital interface 228. The DAC circuitry 224 can output analog audio output signals 226, and the digital interface can output digital audio output signals 230. Further, the digital interface 228 can also include a control interface 232 through which command, configuration and/or other data can be exchanged between the DAB receiver system 202 and other circuitry. For example, channel selections can be provided through the control interface 232, if desired. It is noted that for some embodiments the receiver system 202 can be implemented within a single integrated circuit. Other variations could be implemented.

As described further below, the DAB fast detector 212 detects the presence of digital content within the received signals by detecting a cyclic prefix associated with digital content for the DAB channel and outputs DAB signal detection information to the controller 220. For example, the scan control block 216 can use this detection information 334 to the controller 220 that indicates whether or not digital content is present within a DAB channel.

It is noted that the DSP 202 including the DAB fast detector 212, the DAB demodulator 214, and/or the controller 220 can be implemented using one or more processing devices running software code or instructions to implement the described functions. For example, the DSP 202 can include one or more processing devices such as a microprocessor, a microcontroller, a configurable logic device, complex programmable logic device, field programmable gate array, and/or other processing device that is programmed to implement and/or control the described functionality. It is further noted that software and related processing device(s) used to implement the DSP 202 and/or its components can be implemented as software embodied in a non-transitory computer-readable medium (e.g., memory storage devices, FLASH memory, DRAM memory, reprogrammable storage devices, hard drives, floppy disks, DVDs, CD-ROMs, etc.) including instructions that cause the processing devices to perform the processes, functions, and/or capabilities described herein.

Figure 3:
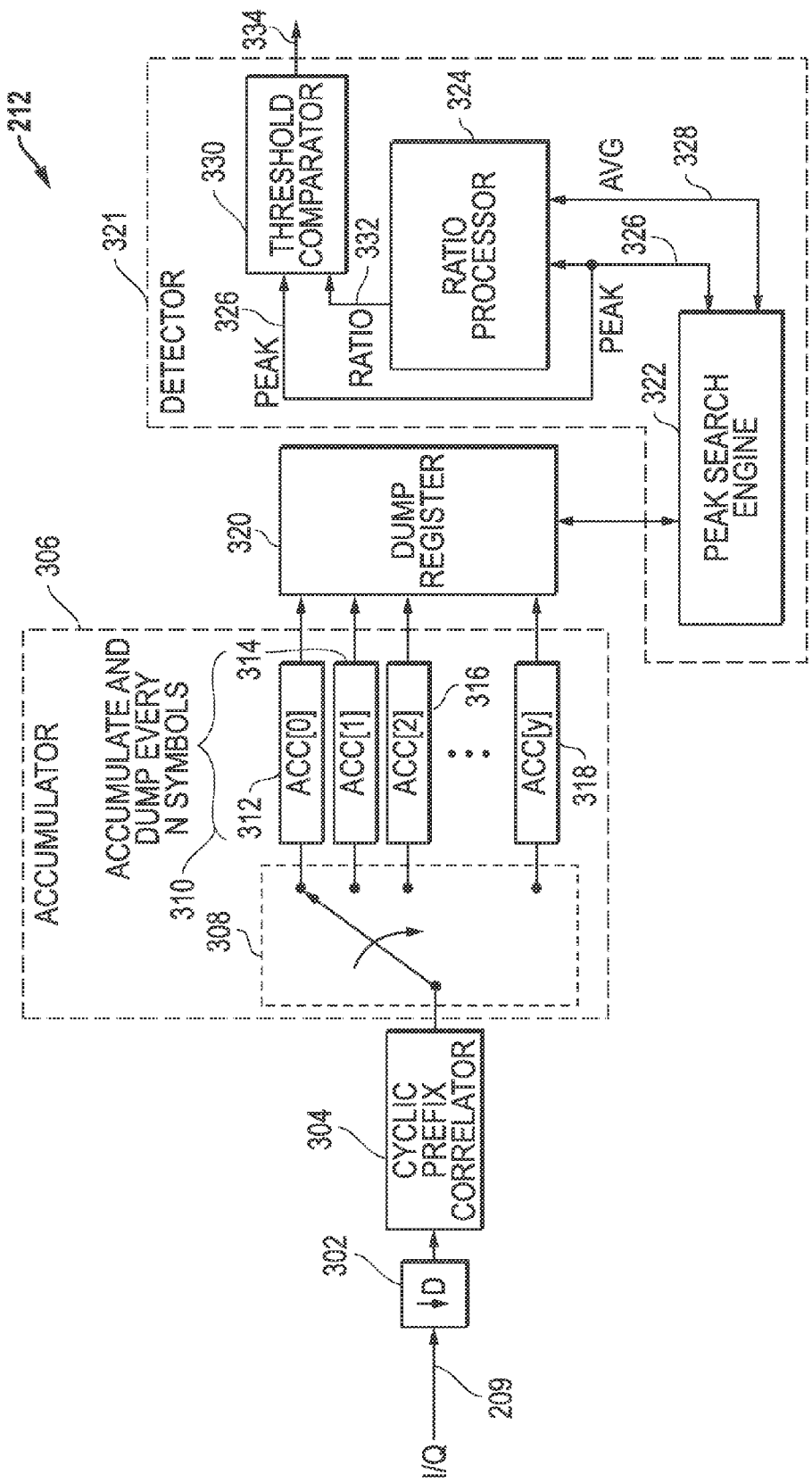
FIG. 3 is a block diagram of an example embodiment for the fast detector of FIG. 2.

FIG. 3 is a block diagram of an example embodiment for fast detector 212. The digital I/Q samples 209 are provided to divide-by-D decimator 302, which can be for example a divide-by-2 decimator. The decimated I/Q samples from the decimator 302 are then provided to cyclic prefix correlator 304. The output correlation values from the of cyclic prefix correlator 304 are then provided to the accumulator 306 that operates to accumulate and store the output values from the cyclic prefix correlator 304 to a dump register 320. For the embodiment depicted, each correlation value from the cyclic prefix correlator 304 is output to and accumulated within one of a plurality of accumulation registers 312, 314, 316 . . . 318 based upon correlation distributer 308. These correlations values are then accumulated over a selected number (N) of symbol times associated with the transmission of the digital content. After correlation values for this plurality of N symbol times have been accumulated as represented by bracket 310, the accumulated correlation values within the first accumulation register (acc[0]) 312, the second accumulation register (acc[1]) 314, the third accumulation register (acc[2]) 316, and so on until the $y^{th}$ accumulation register (acc[y]) 318 are dumped to and stored within the dump register 320. The accumulated correlation values stored within the dump register 320 are then analyzed by a digital content detector 321 to determine whether or not digital content is present within the channel and to output detection information 332 associated with this determination. Further, the accumulation registers 312, 314, 316 . . . 318 can then be reset, if desired, for another additional accumulation and dump cycles.

For the embodiment depicted, the digital content detector 321 includes a peak search engine 322 that analyzes the accumulated correlation values stored in the dump register 320 to determine a peak value and an average value for the correlation values within the dump register 320 every N symbols. The peak search engine 322 then outputs the peak value 326 and the average value (AVG) 328 to the ratio processor 324. The ratio processor 324 determines a ratio of the peak value 326 to the average value 328 (e.g., ratio=PEAK/AVG), a ratio of the peak value 326 to the average value 328 less the peak value 326 (e.g., ratio=PEAK/(AVG-PEAK)), and/or some other desired ratio associated with the peak value 326. It is also noted that absolute values of can be used within these ratio expressions, if desired, so that the resulting ratio values are positive numbers. Other variations can also be implemented.

The threshold comparator 330 receives the ratio 332 and compares the ratio 332 to a threshold ratio value to determine if DAB digital content is present within the channel. For example, if the ratio value 332 is greater than the threshold value, than a determination can be made that DAB digital content is present. Other threshold comparisons could also be made. For example, in some embodiments, the threshold comparator 330 receives the peak value 326 and compares the peak value 326 to a threshold peak value to determine if DAB digital content is present within the channel. For example, if the peak value 326 is greater than the threshold value, than a determination can be made that DAB digital content is present. If DAB digital content is not detected based upon the threshold comparison, a determination can be made that DAB digital content is not present. It is further noted that a ratio comparison, a peak value comparison, and/or one or more other threshold comparisons could be used alone and/or in various combination to make the digital content determination within the threshold comparator 330. After making the determination of whether or not digital content is present in the received signal, the digital content detector 330 outputs a detection signal 334 to indicate whether or not digital content was determined to be present within the channel being analyzed. Other and/or different detection techniques could also be used while still taking advantage of the cyclic prefix correlation techniques described herein.

For one example embodiment, the digital I/Q samples 209 can be provided from ADC circuitry 208 to the DAB fast detector 212 at a sampling rate ($f_S$) of 2.048 mega-samples per second (Ms/S). Other sampling rates could also be used for the ADC circuitry 208. As one example, the divide-by-D decimator 302 can provide a divide-by-2 decimation, although other decimation rates can also be used and the decimation block 302 could also be removed. Further, in one embodiment, the accumulator 306 can be configured to accumulate samples and dump accumulated values into the dump register every four (4) symbols. The number of symbols can also be less than four, if desired, for the accumulation and dump of the cyclic prefix correlation values. Further, other numbers of symbols over four could also be used for the accumulation and dump processing. Further, for the example embodiment in FIG. 3, the number (y) of accumulation registers 312, 314, 316 . . . 318 can be set such that y=(M+L)/D where "D" represents the decimation provided by decimator 302 (e.g., D=2 where the decimator 302 provides a divide-by-2 decimation). Other variations could also be implemented.

In one embodiment, the cyclic prefix correlator 304 can be configured to generate prefix correlation values based upon a recursive analysis of the digital I/Q samples 209. As one example, the recursive analysis used by the cyclic prefix correlator 304 to generate cyclic prefix correlation values (c(n)) can be based upon the following equations:

$$c(n) = \sum_{k=0}^{k=L-1} x(n)x(n-M)^*$$ [EQUATION 1A]

$$c(n)=c(n-1)+x(n)x(n-M)^*-x(n-L)x(n-L-M)^*$$ [EQUATION 1B]

These equations can be used to correlate the received symbol over L samples (e.g., the length of the cyclic prefix) with an M-sample delayed version of itself. It is noted that Equation 1B is a recursive implementation of Equation 1A where the current correlation value (c(n)) is determined based upon the previous correlation value (c(n−1)) plus the next value in the sequence (x(n)x(n−M*)) minus the last value in the current sequence (x(n−L)x(n−L−M*)). For these equations, "M" represents the cyclic prefix delay in numbers of samples; "L" represents the length of the cyclic prefix in numbers of samples; "k" represents a summation index value; and "n" represents the correlation time index value. It is further noted that the "*" represents a complex conjugation. Other variations can be implemented.

It is further noted that the correlation distributor 308 can be configured to distribute correlation values (c(n)) from the cyclic prefix correlator 304 using one or more techniques. For example, each correlation value c(n) can be written into the accumulator 306 using an index (m) such that m=n MODULO (L+M) where the MODULO function provides a remainder for n divided-by L+M.

Figure 4:
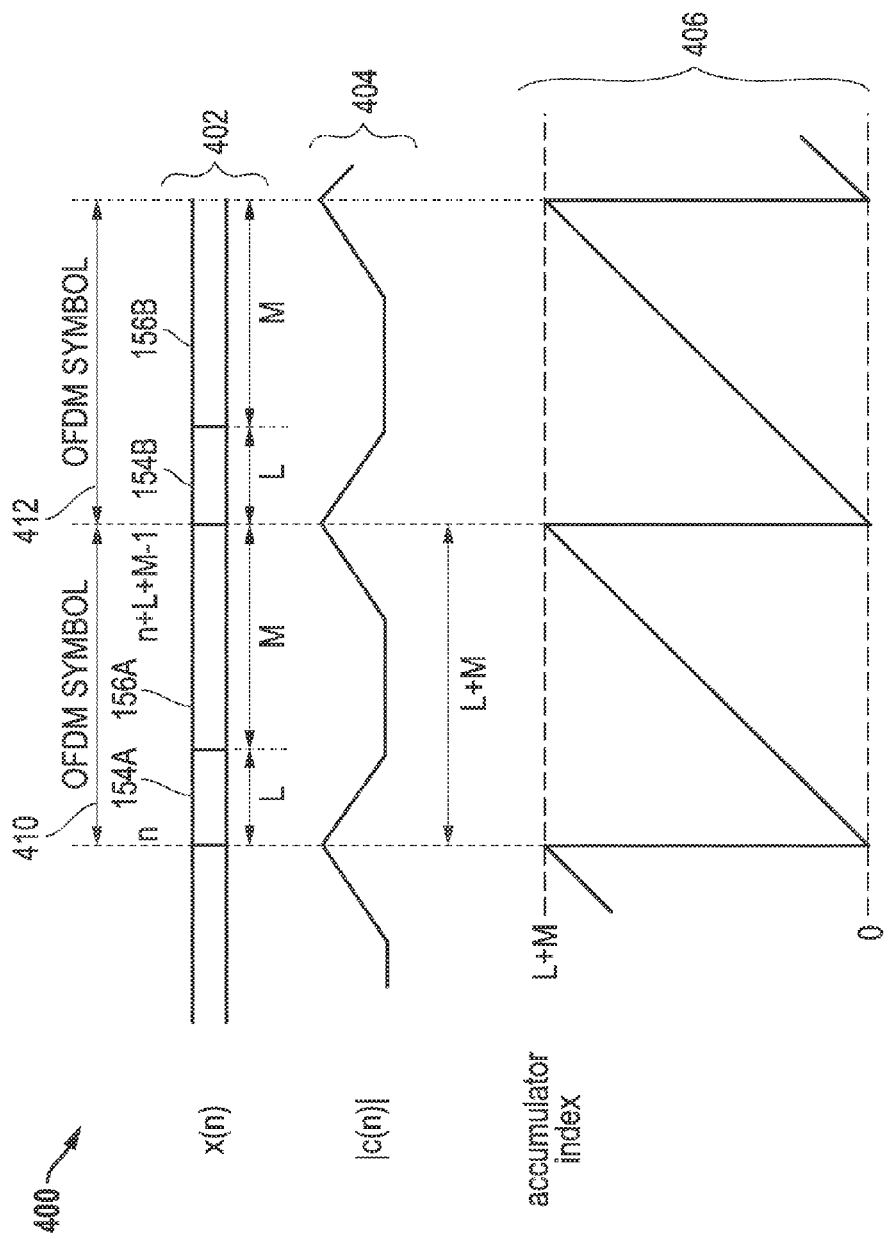
FIG. 4 is a diagram of example embodiment for correlation values and accumulator index values for an example signal received by the fast detector of FIG. 3.

FIG. 4 is a diagram of example embodiment 400 for correlation values and accumulator index values for an example signal. The input signal (x(n)) 402 include two OFDM symbols 410 and 412. These two OFDM symbols 410/412 include cyclic prefixes 154A and 154B (e.g., L symbols in length) and useful data regions 156A and 156B (e.g., M symbols in length), respectively. Each of the OFDM symbols 410 and 412 have signal index values from a first index value "n" to a last index value of "n+L+M−1." The correlation values (c(n)) 404 for the signal index values are represented as absolute values, and these correlation values (c(n)) 404 ramp up during the last L-samples of the OFDM symbols 140/142 and ramp down during the cyclic prefix 154A/154B for each OFDM symbol 140/142. The peak value for the correlation values (c(n)) 404 within the L+M symbols for each OFDM symbol 410/412 occur at the beginning of each OFDM symbol 154A/154B. The accumulator index 406 is varied from 1 to L+M and is incremented each symbol. Once L+M is reached, the accumulator index 406 is reset to 1 for the next symbol. As such, the accumulator index 406 cycles from 1 to L+M for each symbol 410/412 and is used by the correlation distributor 308 to determine in which of the accumulation registers 312, 314, 316 . . . 318 to store the correlation value (c(n)), as indicated above with respect to FIG. 3. As also indicated above, the correlation values (c(n)) are accumulated over N symbols and then dumped to and stored within dump register 320 in FIG. 3. It is further noted that accumulation registers 312, 314, 316 . . . 318 can be reset to zero, if desired, when the accumulated values are dumped in the dump register 320 after N symbols. Other variations could also be implemented.

Figure 5:
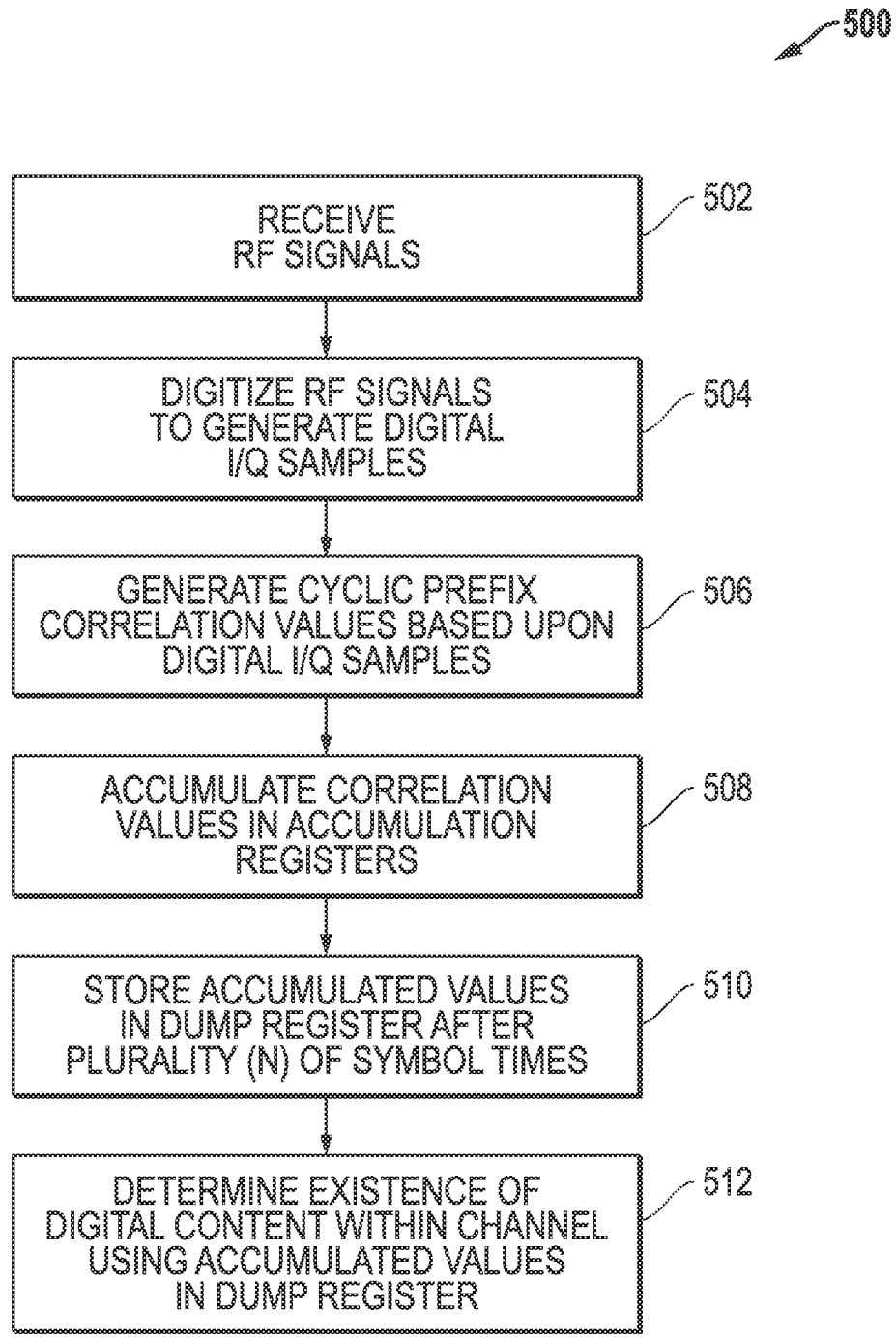
FIG. 5 is a process flow diagram of an example embodiment for fast detection of digital content with broadcast channel transmissions.

FIG. 5 is a process flow diagram of an example embodiment 500 for fast detection of digital content with DAB broadcast channels. In block 502, RF signals are received. In block 504, the RF signals are digitized to generate digital I/Q samples associated with the received RF signals. In block 506, cyclic prefix correlation values are generated based upon the digital I/Q samples. In block 508 the correlation values are accumulated within a plurality of accumulation registers over a plurality (N) of symbol times. In block 510, the accumulated correlation values are stored in a dump register after the plurality (N) of symbol times. Finally, in block 512, existence of digital content within a broadcast channel is determined using the accumulated values stored in the dump register.

It is noted that the functional blocks described herein can be implemented using hardware, software, or a combination of hardware and software, as desired. In addition, one or more processors or other processing devices running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory storage devices, FLASH memory, random access memory, read only memory, programmable memory devices, reprogrammable storage devices, hard drives, floppy disks, DVDs, CD-ROMs, and/or any other tangible storage medium) and that are executed by one or more controllers, microcontrollers, microprocessors, hardware accelerators, processors, and/or other processing devices to perform the operations and functions described herein. It is further understood, therefore, that one or more of the tasks, functions, or methodologies described herein may be implemented, for example, as software or firmware and/or other instructions embodied in one or more non-transitory tangible computer readable mediums that are executed by a CPU (central processing unit), controller, microcontroller, processor, microprocessor, FPGA (field programmable gate array), CPLD (complex configurable logic device), CLD (configurable logic device), ASIC (application specific integrated circuit), or other suitable processing device or combination of such processing devices.

Further modifications and alternative embodiments will be apparent to those skilled in the art in view of this description. It will be recognized, therefore, that the present invention is not limited by these example arrangements described herein. Accordingly, this description is to be construed as illustrative only and is for the purpose of teaching those skilled in the art the manner of carrying out the invention. It is to be understood that the forms of the invention herein shown and described are to be taken as the example embodiments. Various changes may be made in the implementations and architectures described herein. For example, equivalent elements may be substituted for those illustrated and described herein, and certain features of the embodiments may be utilized independently of the use of other features, as would be apparent to one skilled in the art after having the benefit of this description.

What is claimed is:

1. A method for detecting digital content in a radio frequency (RF) channel, comprising:
    receiving radio frequency (RF) signals;
    digitizing signals associated with a channel within the RF signals to generate digital samples having a real component (I) and an imaginary component (Q);
    generating cyclic prefix correlation values based upon the digital samples over a selected number of symbol times associated with digital content being detected within the channel, the selected number of symbol times being a plurality of symbol times;
    accumulating the cyclic prefix correlation values in a plurality of accumulation registers over the selected number of symbol times to form a plurality of accumulated correlation values;
    storing the accumulated correlation values in a dump register after the selected number of symbol times;
    utilizing the accumulated correlation values within the dump register to determine whether digital content is present within the channel; and
    outputting a detection signal indicating whether or not digital content is present.

2. The method of claim 1, wherein the digital content is included within OFDM (orthogonal frequency division multiplexed) subcarriers within the channel.

3. The method of claim 2, wherein the digital content is modulated within the subcarriers based upon a DAB (Digital Audio Broadcast) standard.

4. The method of claim 1, wherein the selected number of symbol times is equal to or less than four symbol times.

5. The method of claim 1, wherein a detection time to determine if digital content is present within the channel is 5 milliseconds or less.

6. The method of claim 1, wherein the utilizing step comprises searching for a peak accumulated correlation value within the dump register and comparing the peak accumulated value to a threshold value to determine whether digital content is present within the channel.

7. The method of claim 1, wherein the utilizing step comprises searching for a peak accumulated correlation value within the dump register, determining an average correlation value for the correlation values within the dump register, and comparing a ratio associated with the peak accumulated correlation value and the average correlation value to a threshold ratio value to determine whether digital content is present within the channel.

8. The method of claim 1, wherein the generating step comprises applying a recursive analysis to the digital samples to generate the cyclic prefix correlation values.

9. The method of claim 1, further comprising decimating the digital I/Q samples prior to generating step.

10. The method of claim 1, further comprising using the detection signal as part of a channel scan operation, and repeating the receiving, digitizing, generating, accumulating, dumping, utilizing and outputting steps for a plurality of different channels.

11. A receiver system for detecting digital content in a radio frequency (RF) channel, comprising:
    front-end circuitry configured to receive radio frequency (RF) signals and to output signals associated with a channel within the RF signals;
    analog-to-digital conversion (ADC) circuitry configured to receive the output signals and to output digital samples having a real component (I) and an imaginary component (Q);
    a plurality of accumulation registers;
    a dump register;
    a correlator configured to generate cyclic prefix correlation values based upon the digital samples over a selected number of symbol times associated with digital content being detected within the channel, the selected number of symbol times being a plurality of symbol times;
    an accumulator configured to accumulate the cyclic prefix correlation values in the plurality of accumulation registers over the selected number of symbol times to form a plurality of accumulated correlation values and to store the accumulated correlation values to the dump register after the selected number of symbol times; and
    a detector configured to utilize the accumulated correlation values to determine whether digital content is present within the channel and to output a detection signal indicating whether or not digital content is present.

12. The receiver system of claim 11, wherein the digital content is included within OFDM (orthogonal frequency division multiplexed) subcarriers within the channel.

13. The receiver system of claim 12, wherein the digital content is modulated within the subcarriers based upon a DAB (Digital Audio Broadcast) standard.

14. The receiver system of receiver system 11, wherein the selected number of symbol times is equal to or less than four symbol times.

15. The receiver system of claim 11, wherein a detection time to determine if digital content is present within the channel is 5 milliseconds or less.

16. The receiver system of claim 11, wherein the digital content detector comprises a peak search engine configured to identify a peak accumulated correlation value within the dump register and a threshold comparator configured to compare the peak accumulated value to a threshold value to determine whether digital content is present within the channel.

17. The receiver of claim 11, wherein the digital content detector comprises a peak search engine configured to identify a peak accumulated correlation value within the dump register and to determine an average correlation value for the correlation values within the dump register and a threshold comparator configured to compare a ratio associated with the peak accumulated correlation value and the average correlation value to a threshold ratio value to determine whether digital content is present within the channel.

18. The receiver system of claim 11, wherein the correlator is configured to apply a recursive analysis to the digital samples to generate the cyclic prefix correlation values.

19. The receiver system of claim 11, further comprising a decimator configured to receive the digital I/Q samples and to provide decimated digital I/Q samples to the correlator.

20. The receiver system of claim 11, further comprising a controller configured to perform a channel scan operation detection signals generated for a plurality of different channels.

* * * * *